United States Patent [19]

Takemura et al.

[11] 4,391,356
[45] Jul. 5, 1983

[54] CLUTCH ENGAGEABLE/DISENGAGEABLE BY MOMENTARY ENERGIZATION OF SOLENOID MEANS

[75] Inventors: Toji Takemura; Kenzo Hirashima, both of Yokosuka, Japan

[73] Assignee: Nissan Motor Co. Ltd., Yokohama, Japan

[21] Appl. No.: 361,809

[22] Filed: Mar. 25, 1982

[30] Foreign Application Priority Data

May 21, 1981 [JP] Japan .................. 56-76860

[51] Int. Cl.³ ............................................. F16D 27/10
[52] U.S. Cl. .............................. 192/84 C; 192/89 B; 310/78
[58] Field of Search ............... 310/78, 76; 192/84 C, 192/84 R, 89 B, 89 R; 188/72.1, 72.3, 163

[56] References Cited

U.S. PATENT DOCUMENTS

| | | | |
|---|---|---|---|
| 2,899,897 | 8/1959 | Ludwig | 192/89 B |
| 2,919,000 | 8/1961 | Claytor | 192/84 R |
| 2,962,143 | 9/1961 | Heinemann | 192/84 PM |
| 2,988,189 | 9/1961 | Thomas | 192/99 S |
| 3,216,543 | 11/1965 | Schröter | 192/89 B |
| 4,131,185 | 12/1978 | Schall | 192/53 B |
| 4,187,938 | 2/1980 | Miller | 192/54 |
| 4,189,042 | 2/1980 | Miller | 192/84 C |
| 4,235,321 | 11/1980 | Stein | 192/56 R |

FOREIGN PATENT DOCUMENTS

| | | |
|---|---|---|
| 1182736 | of 0000 | France . |
| 1188724 | of 0000 | United Kingdom .. |
| 1237706 | of 0000 | United Kingdom . |
| 1251165 | of 0000 | United Kingdom . |
| 1443957 | of 0000 | United Kingdom . |

*Primary Examiner*—J. D. Miller
*Assistant Examiner*—D. L. Rebsch

[57] ABSTRACT

An electromagnetic clutch includes a mechanism which is responsive to a first short energization of an electromagnet thereof to cause a spring arrangement therein to snap to a reverse configuration wherein it holds the clutch engaged until a second short energization with a current larger than that used for the first energization, whereupon the mechanism again reverses the configuration of the spring and subsequently causes the clutch to disengage.

4 Claims, 7 Drawing Figures

FIG.3
FIG.4
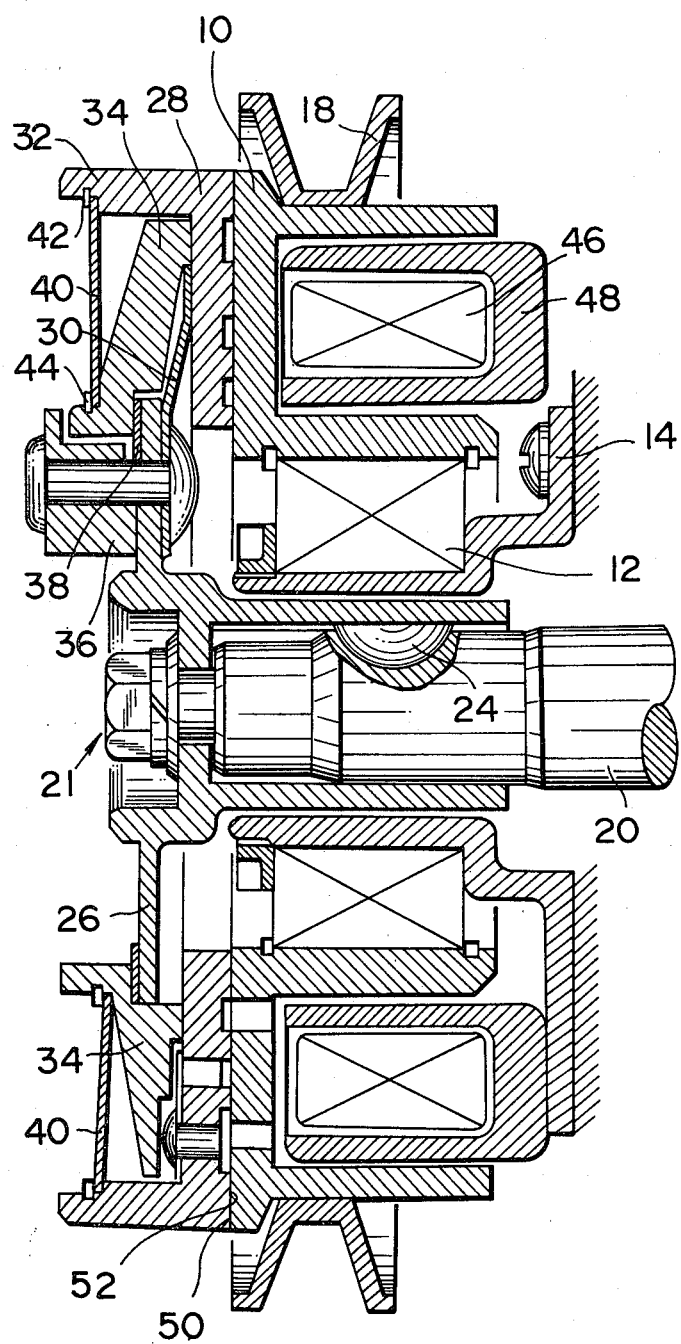
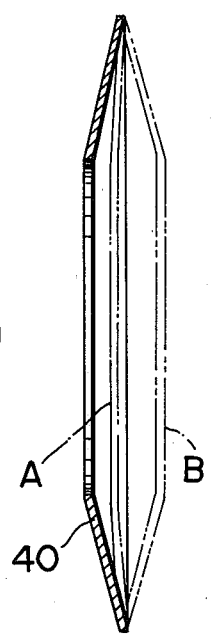

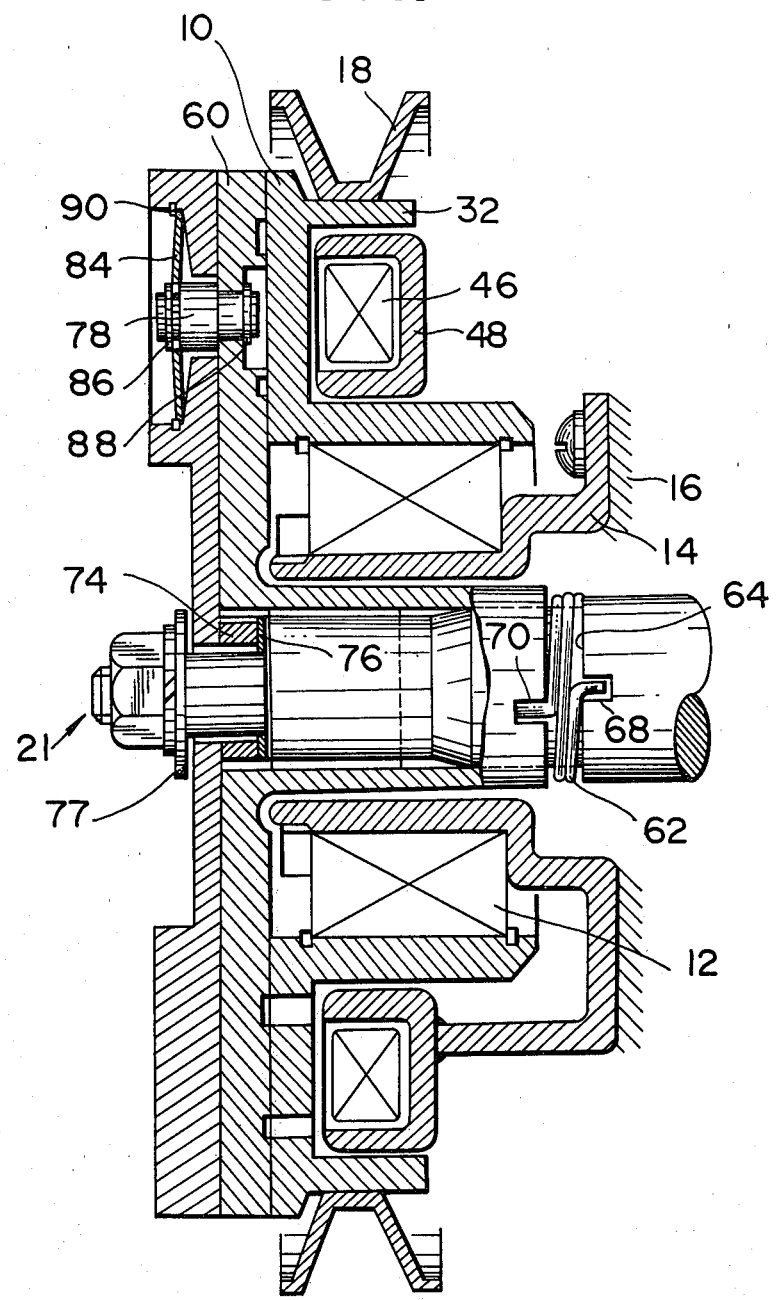

CLUTCH ENGAGEABLE/DISENGAGEABLE BY MOMENTARY ENERGIZATION OF SOLENOID MEANS

BACKGROUND OF THE INVENTION

1. Field of the Invention

The present invention relates generally to an electromagnetic clutch and more specifically to a mechanical-electromagnetic clutch which may be engaged and disengaged by appying electric current for only momentary periods.

2. Description of the Prior Art

In previously proposed electromagnetic clutches it has been necessary to continously supply electic current to the electromagnet of the clutch to maintain same engaged. This of course has lead to the problem of high electrical power consumption, which especially in automotive vehicles, places an undesirably high load on the battery and/or electrical system thereof.

SUMMARY OF THE INVENTION

The present invention features an electromagnetic clutch which is engaged by a momentary energization of an electromagnet thereof and which thereafter is held engaged by mechanical force until the electromagnet is energized for a second time but with a current larger than that required to induce engagement, whereupon the clutch is disengaged. That is to say, the clutch includes a mechanism which is responsive to a first short energization of an electromagnet thereof to cause a spring arrangement therein to snap to a reverse configuration wherein it holds the clutch engaged until a second short energization with a current larger than that used for the first energization, whereupon the mechanism again reverses the configuration of the spring and subsequently causes the clutch to disengage.

BRIEF DESCRIPTION OF THE DRAWINGS

The features and advantages of the arrangement of the present invention will become more clearly appreciated from the following description taken in conjunction with the accompanying drawings in which

FIG. 3 is a cross-section of the clutch shown in FIGS. 1 and 2 but in the process of disengaging;

FIG. 4, is a schematic cross-section showing the positions assumed by a spring of the clutch in the engaged and disengaged positions "B" and "A" respectively;

FIG. 7 is a sectional view similar to FIGS. 5 and 6 but showing the clutch in the process of disengaging.

DETAILED DESCRIPTION OF THE PREFERRED EMBODIMENTS

Figure 1:
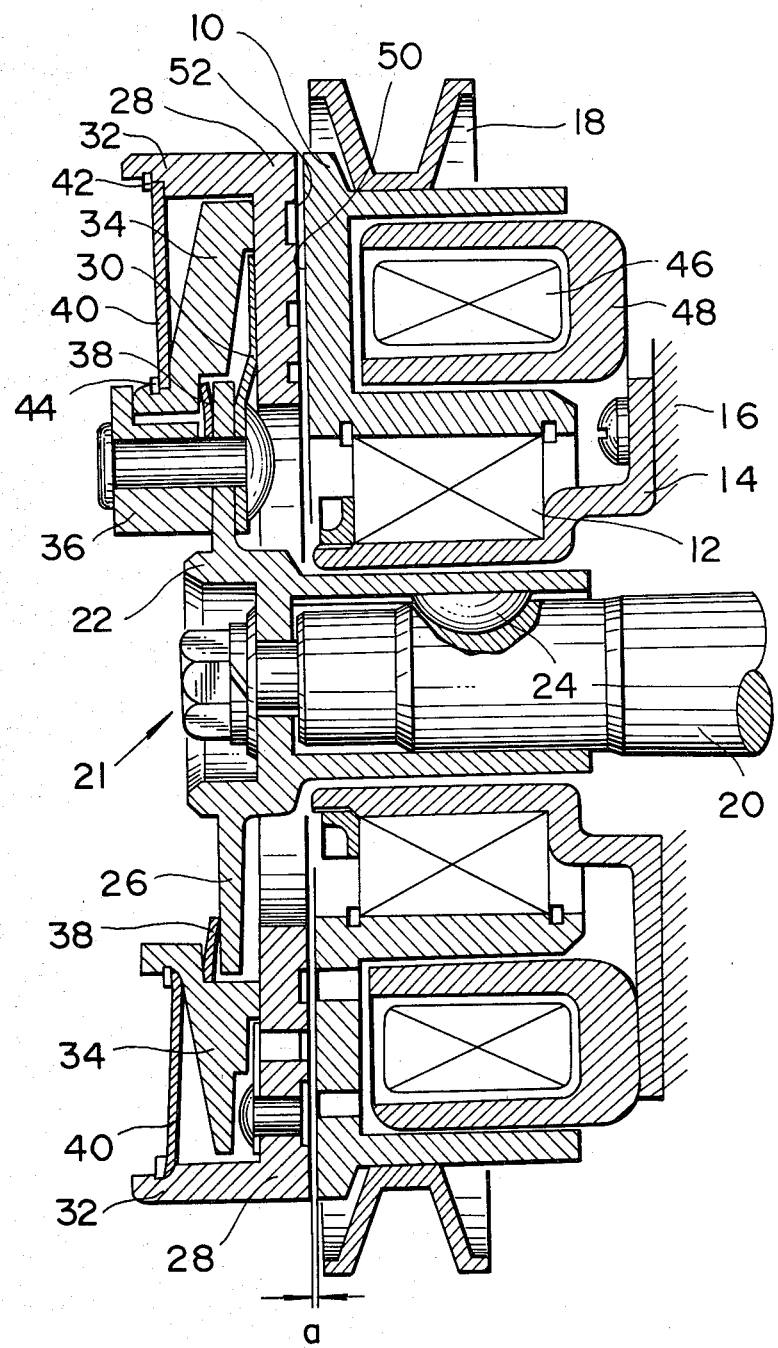
FIG. 1 is a cross-section of a first embodiment of an mechanical-electromagnetic clutch according the present invention. In this figure the clutch is shown disengaged.

Turning now to the Figures and more specifically to FIGS. 1 to 4, a first embodiment of the present invention is shown in which a drive output wheel or driven wheel 10 (as it will be referred to hereinafter) is rotatably mounted on a suitable bearing 12 (such as a roller bearing) which in turn is mounted on an annular retainer 14 fixedly connected to a chassis 16 (such as that of an automotive vehicle).

Fixedly disposed on the external periphery of the driven wheel 10 is a V-belt pulley 18. Disposed through the aperture defined within the annular retainer 14, is a driven input shaft 20. This shaft 20 may be connected either directly or indirectly to the crankshaft of an engine of a vehicle by way of example. A hollow member 22 is keyed (via key 24) on the end of the driven input shaft 20 and secured against axial movement by a spring washer and nut 21. The hollow member 22 is formed with a radially extending flange 26.

A ferro-magnetic friction plate 28 is disposed coaxially about the driven input shaft 20 and drivingly connected to the flange of the hollow member through three (by way of example) springy strap-like members 30 which allow the piston to move axially with respect to the input shaft 20 but which maintain synchronous rotation therebetween). The friction plate 28 is formed with a peripheral flange 32 within which an annular frustro-conical piston 34 made of a ferro-magnetic material is reciprocally disposed. Shims 30 are rivetted to the flange 36 and serve to retain the piston 34 within the bore defined by the peripheral flange 32 and to secure a first annular disc spring 38 between piston 34 and the radial flange 26. This spring 38 biases the piston 34 away from the flange 26 with a first predetermined force. A second and larger disc spring 40 is operatively secured between the inner periphery of the peripheral flange 32 and the inner periphery of the piston 34 via snap rings 42, 44 respectively.

Fixed to the annular retainer 14 and projecting into an annular space formed in the driven wheel 10 is an is an electromagnet 46. The electromagnet is enclosed within a casing 48 and juxtaposes the front of the driven wheel where the friction facing 50 is formed.

The arrangement shown in FIG. 1 depicts the clutch in a disengaged condition with the friction facings of the driving wheel and the friction plate 50, 52 separated by a given distance "a".

In operation, to engage the clutch, the electromagnet 46 is energized for a short period with a first given amount of current. The amount of current is such as to attract the friction plate 28 toward and into engagement with the driven wheel 10 but not enough to overcome the bias of the spring 38 and move the piston 34. The bias exerted by the strap-like members 30 on the friction plate 28 is relatively low and for practical considerations may be considered negligible.

Figure 2:
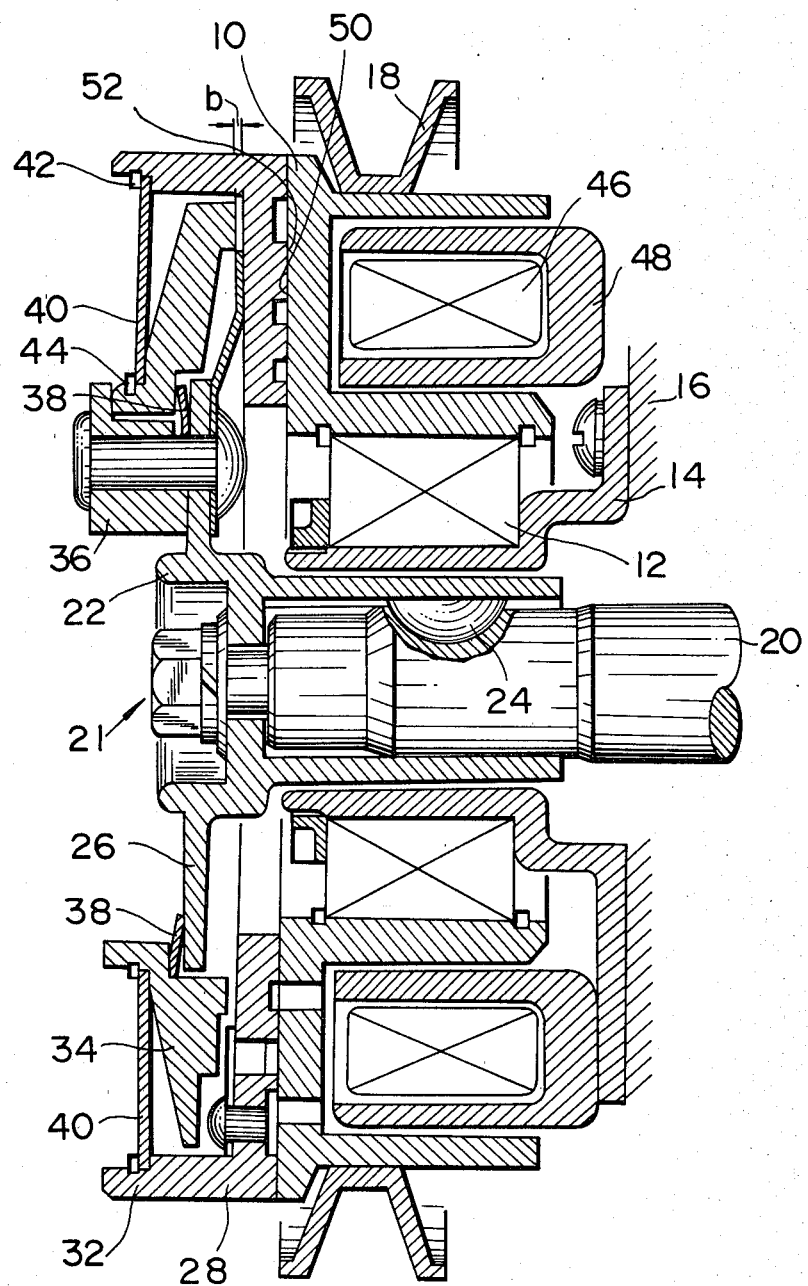
FIG. 2 is a cross-section similar to FIG. 1 but showing the clutch in an engaged condition.

When the friction plate 28 moves toward the driven wheel 10, the disc spring 40 snaps from the configuration shown in FIG. 1 to that shown in FIG. 2, wherein it maintains the friction facings 50,52 in contact without the need of continuously energizing the electromagnet 46. As shown, in this engaged condition the piston 34 is separated from the friction plate 28 by a distance "b" under the influence of the disc spring 38.

Now, when it is desired to disengage the clutch, the electromagnet 46 is energized with a larger current than used to engage same and one that is sufficient to attract the piston 34 toward and into contact with the friction plate 38 against the bias of both of the disc springs 38, 40. When the piston 34 moves through the distance "b", (see FIG. 3), the disc spring 40 is induced to snap back to a configuration essentially the same as that in FIG. 1.

The bias of the disc springs 38,40 then cooperate to move the friction plate 28 away and out of engagement with the driven wheel 10 and back into a position such as shown in FIG. 1.

In order to minimize the force required to engage the clutch 40 it is preferred to have the disc spring 40 assume a configuration, when the clutch is disengaged, close to that at which reversal of the shape will occur. Viz., a configuration such as shown by "A" in FIG. 4. The reason for this is that as disc spring of the nature used in the present invention approaches the point where it buckles and snaps to the reverse cone shape, the force required to induce deformation decreases. Thus, with the disc spring 40 set in this manner a relatively low force is required to deform the disc spring 40 to the point where it will snap. However, to have the spring exert the maximum force in the engaged clutch condition, it is of course preferred to allow the spring to approach its maximum deformity, such as shown denoted by "B" in FIG. 4.

Figure 5:
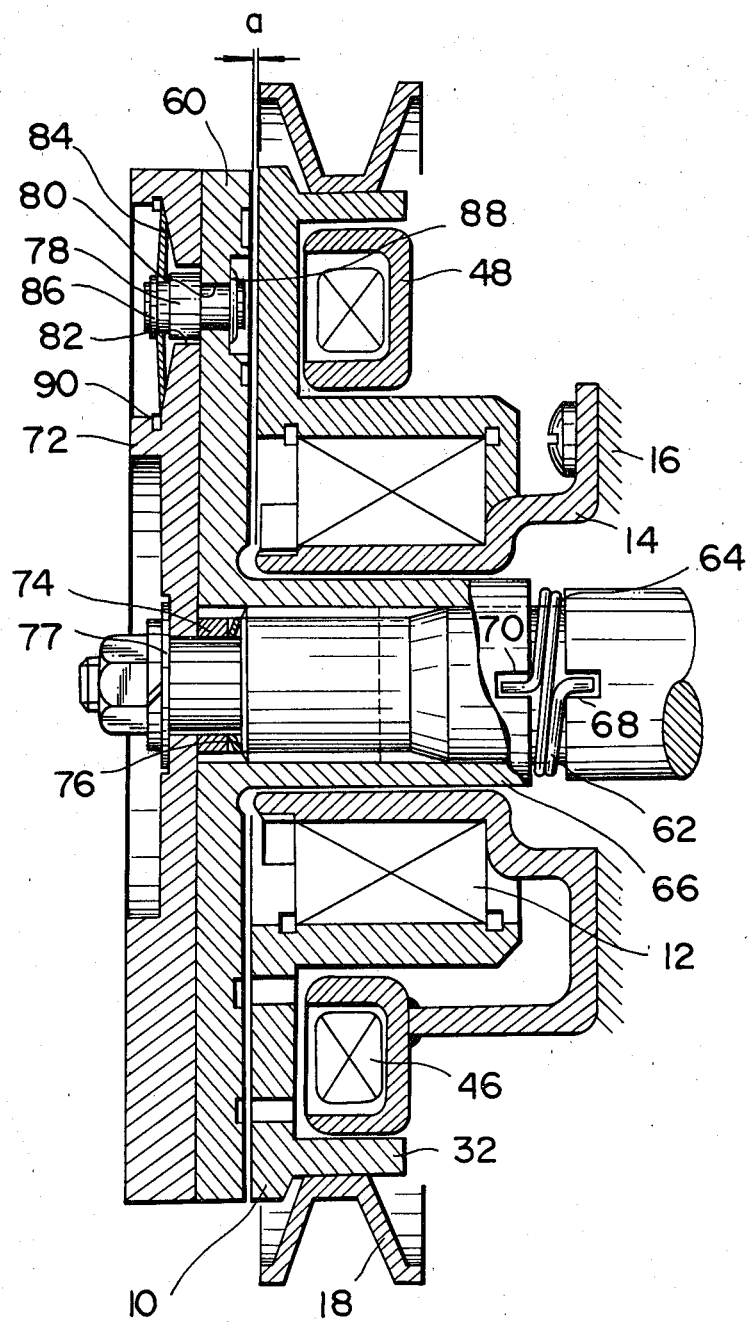
FIG. 5 is a sectional view of a second embodiment of the present invention. In this figure, the clutch is shown disengaged.
Figure 6:
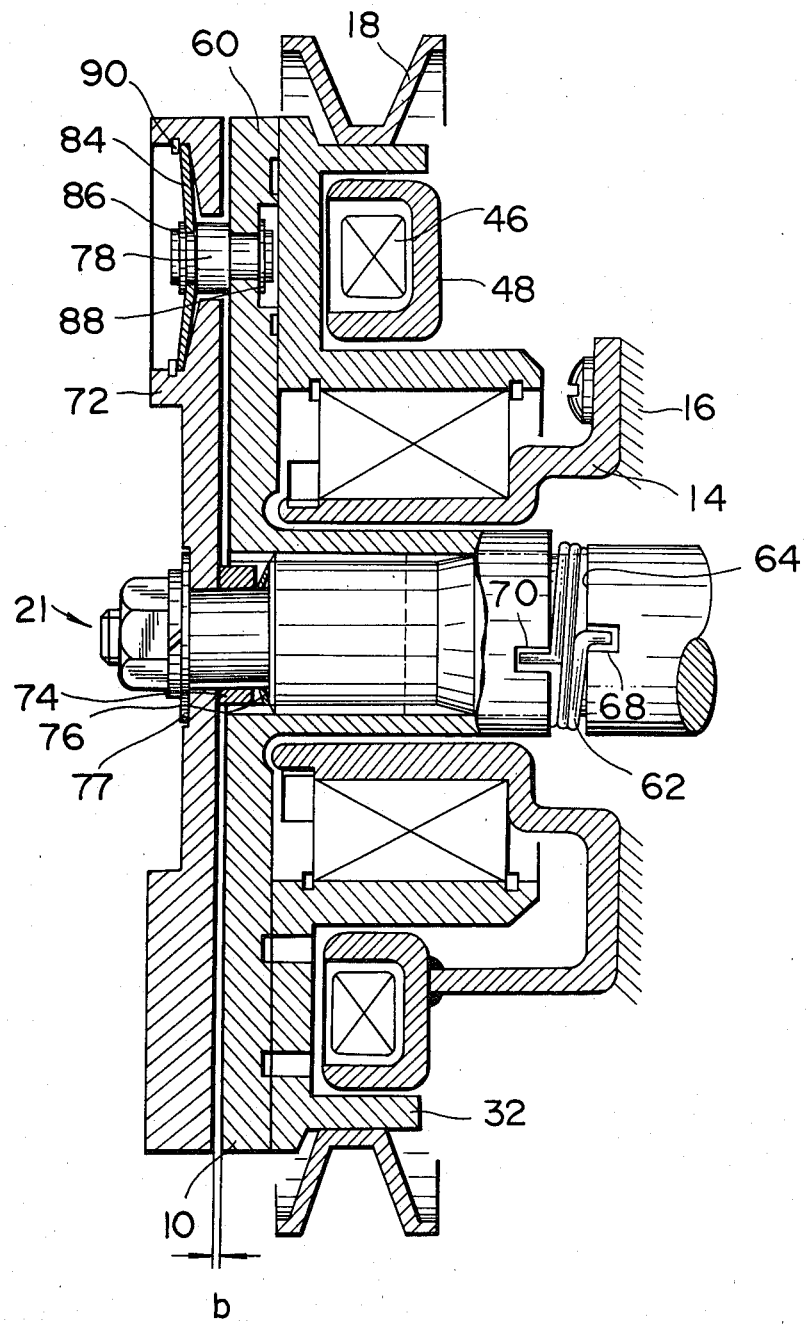
FIG. 6 is a sectional view similar to FIG. 5, but showing the clutch in the engaged condition.

Turning now to FIGS. 5 to 7, a second embodiment of the present invention is shown. In this embodiment a friction plate 60 is splined to the input shaft 20 for synchronous rotation therewith. A coil (compression) spring 62 is interposed between a shoulder 64 on the input shaft and the end of a tubular extension 66 which is integral with the friction plate 60. The ends of this spring are received in slots 68, 70 formed in the input shaft 20 and the tubular extension 66, respectively. The spring 62 biases the friction plate 60 in a direction away from the shoulder 64.

A pressure plate-like arrangement 72 is also mounted on the input shaft 20 and retained thereon via a spring washer and nut 21. A spacer 74 and disc spring 76 are mounted on a reduced diameter portion of the input shaft 20 for the purpose of independently biasing the pressure plate 72 (as it will be referred to hereinafter) in a direction away from the aforementioned shoulder 64 and into abutment with a plain washer 77 secured an the end of the input shaft 20 by the spring washer and nut 21.

A plurality of stepped shafts 78 are disposed through different diameter coaxially arranged through holes 80, 82 formed in the pressure plate 72 and the friction plate 60 respectively. A plurality of disc springs 84 are each disposed on one of the stepped shafts 78 and retained thereon via snap ring 86. Snap rings 88 are utilized to secure the stepped shafts 78 to the friction plate 60. Snap rings 90 secure the disc springs 84 to the pressure plate 72.

The arrangement shown in FIG. 5 depicts the clutch in a disengaged condition with the friction facings of the friction plate and the driven wheel separated by a distance of "a".

In operation, when it is desired to engage the clutch the electromagnet 46 is energized with a first relatively low predetermined current. This current is selected to be sufficient to attract only the friction plate 60 toward the driven wheel 10 against the bias of the disc springs 84 and the coil compression spring 62 and not overcome the bias of the disc spring 76. Thus, the friction plate 60 separates from the pressure plate 72 by a distance "b" and assumes a position as shown in FIG. 6. Due to this separation, the disc springs 84 are deformed, and snap to a reverse cone configuration wherein they bias the friction plate 60 and the pressure plate 72 apart and subsequently bias the friction plate 60 against the driven wheel 10. In this condition, the supply of current to the electromagnet 46 may be terminated and the disc springs 84 be relied upon to bias the friction plate 60 against the driven wheel 10 with an adequate amount of force to prevent slippage therebetween.

When it is desired to disengage the clutch, a second current which is higher than the first is supplied to the electromagnet. This current is selected to produce an attractive force which overcomes the force of the disc spring 76 and the disc springs 84 and to attract the pressure plate 72 into contact with the friction plate 60 compressing the disc spring 76 (as shown). As the pressure plate 72 moves toward the friction plate 60 and out of abutment with the plain washer 77 under this attraction, the disc springs 84 reverse their configuration. Thus, upon termination of the energization of the electromagnet 46, the friction plate 60 and the pressure plate 72 are moved away from the driven wheel 10 under the bias of the coil spring 62.

What is claimed is:

1. A clutch comprising:
   an input element operatively connected to a prime mover for being driven thereby;
   a first rotatable clutch element;
   a second rotatable clutch element movable with respect to the first clutch element and engageable therewith, said second clutch element being connected to said input element for synchronous rotation therewith;
   first biasing means for biasing said second clutch element away from said first clutch element when in a first state thereof, and for biasing said first and second clutch elements together when in a second state thereof;
   an electromagnet associated with said first clutch element for attracting said second clutch element to said first clutch element and inducing said first biasing means to assume said first state when energized with a first predetermined current; and
   means responsive to the energization of said electromagnet with a second predetermined current which is higher than said first predetermined current for reversing the state of said first biasing means from said second state to said first state and for causing said first and second clutch elements to separate.

2. A clutch as claimed in claim 1, wherein said electromagnet energization responsive means includes a member movable with respect to said second clutch element and second biasing means for biasing said member and said second clutch element apart, said baising means being such as to produce a bias greater than the attraction produced by the first energization of said electromagnet and lower than the attraction produced by the second energization.

3. A clutch as claimed in claim 2 wherein said first biasing means is a disc spring which may assume said first and second states and said member is an annular piston which is disposed within a bore formed in said second clutch element, said disc spring operatively interconnecting said second clutch element and said annular piston and, to assume said first state when said annular piston contacts said second clutch element and assume said second state when said annular piston is separated from said second clutch element by a predetermined distance.

4. A clutch as claimed in claim 2 wherein said member takes the form of a pressure plate which is abutable with one face of said second clutch element and said first biasing means takes the form of a plurality of disc springs each operatively interconnecting said second clutch element and said pressure plate and a spring which biases said second clutch element away from said first clutch element, said plurality of disc springs each assuming said first state when said pressure plate abuts said second clutch element and assume said second state when said pressure plate is separated from said second clutch element by a predetermined distance.

* * * * *